June 5, 1962 J. C. COLLINS 3,037,341
WINDROW ATTACHMENT FOR ROTARY CUTTER
Filed Feb. 23, 1960 2 Sheets-Sheet 2

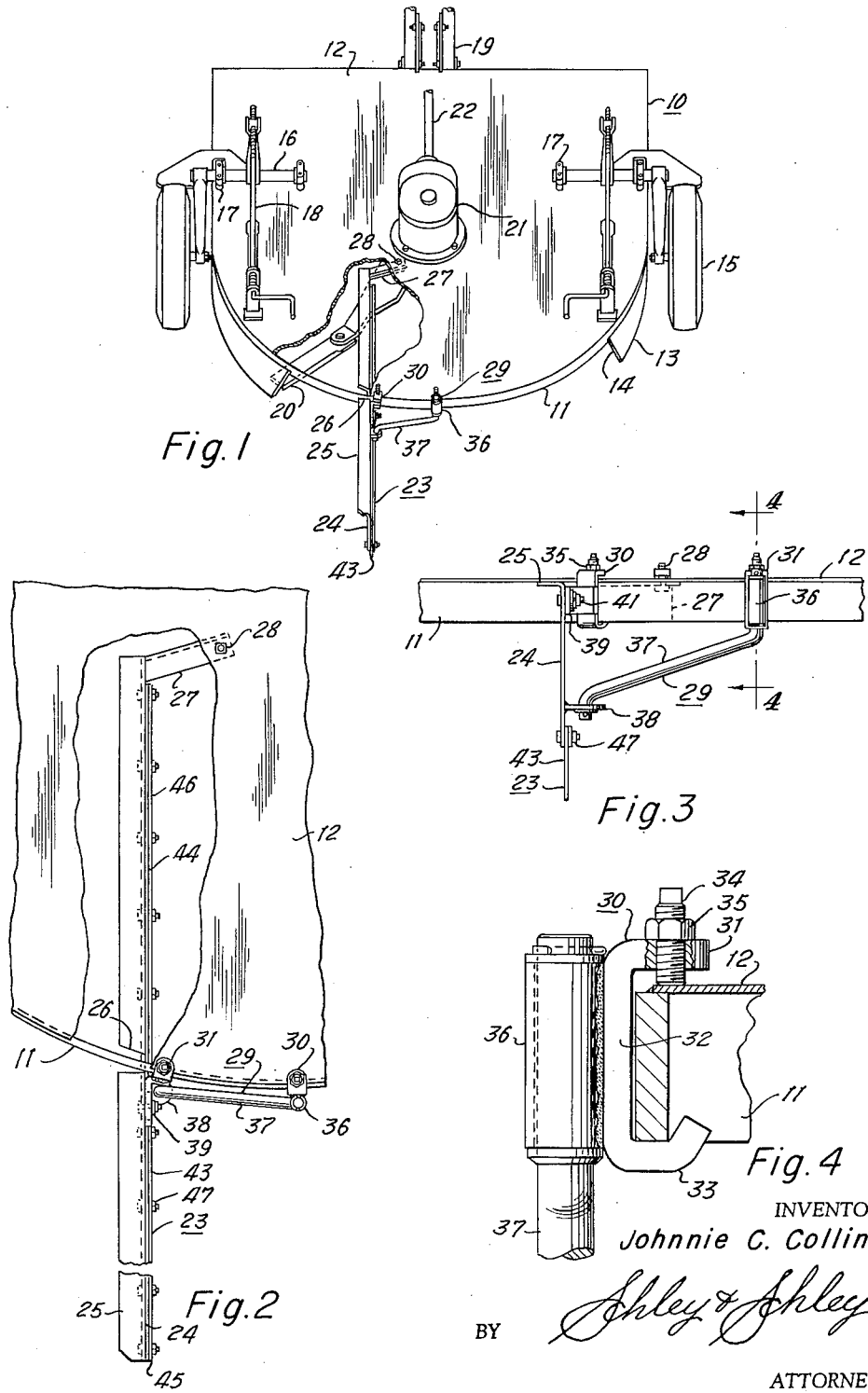

INVENTOR
Johnnie C. Collins
Ashley & Ashley
BY
ATTORNEYS

United States Patent Office 3,037,341
Patented June 5, 1962

3,037,341
WINDROW ATTACHMENT FOR ROTARY CUTTER
Johnnie C. Collins, Dallas, Tex., assignor to Servis Equipment Company, Dallas, Tex., a corporation of Texas
Filed Feb. 23, 1960, Ser. No. 10,340
9 Claims. (Cl. 56—189)

This invention relates to new and useful improvements in windrow attachments for rotary cutters.

One object of the invention is to provide an improved windrow attachment for mounting on rotary cutters of the type used in cutting brush, grass, hay, weeds, row crops and stalks.

Another object of the invention is to provide an improved windrow attachment which is capable of being readily mounted on a rotary cutter so as to virtually eliminate the necessity for a side delivery rake.

A particular object of the invention is to provide an improved windrow attachment for pivotal mounting on a rotary cutter so as to permit adjustment thereof and variation of the width of windrow.

A further object of the invention is to provide an improved windrow attachment, of the character described, having a three-point suspension for rigidly supporting the attachment in adjusted positions.

A construction designed to carry out the invention will be hereinafter described, together with other features of the invention.

Figure 5:
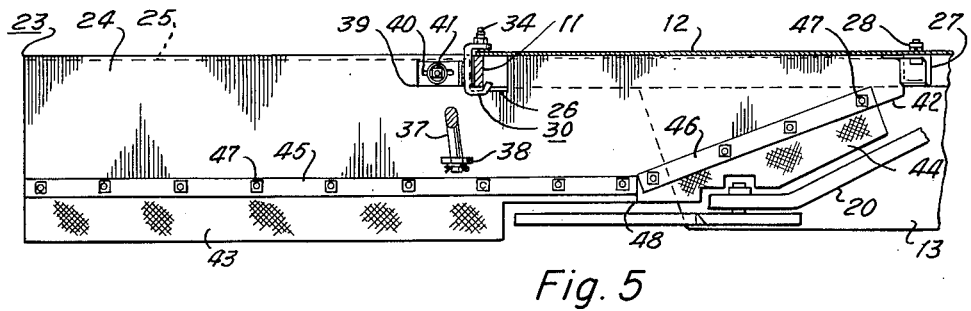
Figure 7:
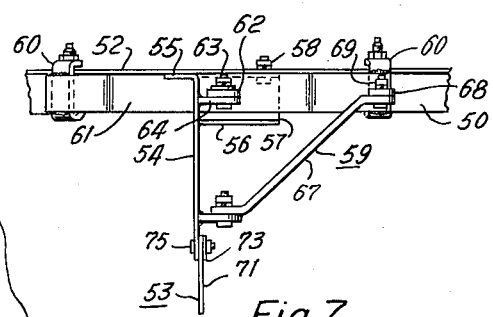
Figure 6:
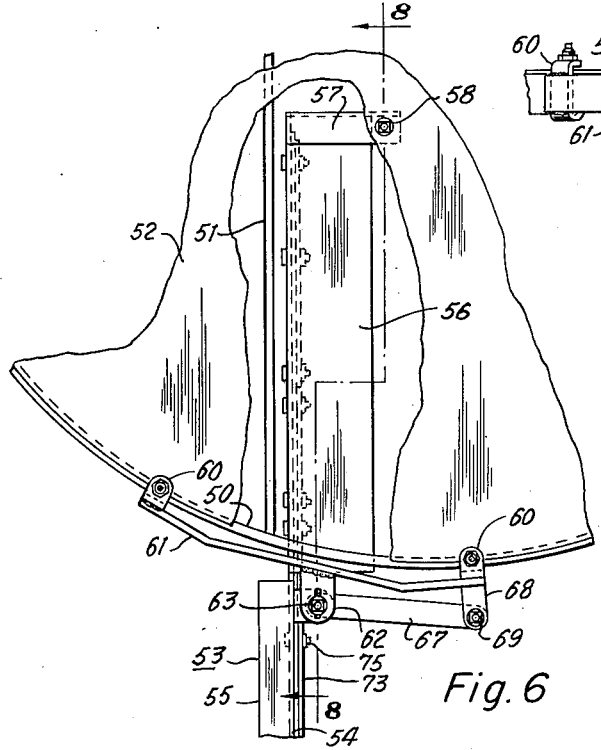
Figure 8:
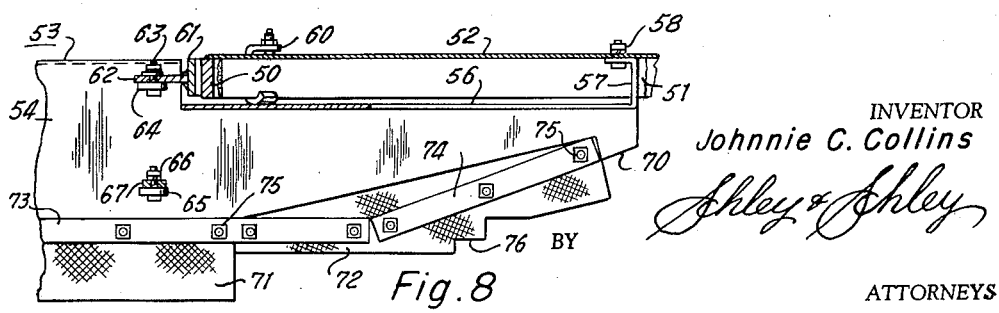

The invention will be more readily understood from a reading of the following specification and by reference to the accompanying drawings, wherein examples of the invention are shown, and wherein:

FIG. 1 is a rear perspective view of a rotary cutter, with parts broken away, having mounted thereon a windrow attachment constructed in accordance with the invention, FIG. 2 is an enlarged, fragmentary, top plan view of the windrow attachment and a portion of the housing of the cutter which is partly broken away, FIG. 3 is a rear elevational view of the attachment and a portion of the cutter housing, FIG. 4 is an enlarged, transverse, vertical, sectional view, taken on the line 4—4 of FIG. 3, FIG. 5 is an enlarged, fragmentary, side elevational view of the attachment with a portion of the cutter housing being shown in section, FIG. 6 is a view, similar to FIG. 2, of a modified windrow attachment, FIG. 7 is a view, similar to FIG. 3, of the modified attachment, and FIG. 8 is an enlarged, transverse, vertical, sectional view, taken on the line 8—8 of FIG. 6.

In the drawings, the numeral 10 designates the body or housing of a rotary cutter having a marginal frame 11, which is arcuate or semi-circular at its rear portion, a horizontal top or cover plate 12, and upright skirts or side plates 13 depending from the frame. The skirts 13 terminate forwardly of the rear portion of the housing 10 so that most of the arcuate portion of the frame 11 is exposed and a wide opening 14 is provided at the rear of said housing, the front (not shown) of which is open. A pair of ground wheels 15 are mounted on offset axes 16 which overlie the cover plate 12 and which are journaled in suitable bearings 17. A crank or lift assembly 18 is provided for each axle 16 for rocking the axle about its axis to raise and lower each wheel 15 and adjust the elevation of the housing relative to the ground. A tongue assembly 19 is carried by the forward portion of the housing to permit pulling of the rotary cutter. For revolving the blade assembly 20, a gear box assembly 21 is mounted on the cover plate and has a drive shaft 22 extending forwardly therefrom.

A windrow attachment 23 is adapted to extend longitudinally of the rear portion of the housing 10 through its opening 14 between the cover plate 12 and blade assembly 20 and includes an elongated, upright, substantially rectangular member or baffle plate 24, of metal or other rigid material, which is partly below and partly rearward of said cover plate. The upper longitudinal margin of the baffle plate is bent upon itself to provide a substantially horizontal flange 25. As shown by the numeral 26 in FIGS. 1, 2 and 5, the plate 24 and its flange 25 are recessed at their intermediate portions to accommodate the frame 11. One end of a lateral arm or angle bar 27, which is of short length and which has its outer or free end pivotally fastened by a suitable bolt and nut 28 to the cover plate 12 adjacent the gear box assembly 21, is welded or otherwise secured to the inner or front end of the baffle plate. Due to this arrangement, the windrow attachment is pivotally connected to the cover plate for swinging movement in an arc about the axis of the bolt 28.

For securing the windrow attachment 23 in adjusted positions, a mounting assembly 29 is provided for coacting with the frame 11. The mounting assembly 29 includes a pair of clamps 30 which are substantially C-shaped, having an upper, horizontal portion or arm 31 overlying the frame and the margin of the cover plate 12, an upright portion or leg 32 for engagement with the outer face of said frame, and a lower angular portion or hook 33 for underlying said frame (FIG. 4). An upright, adjusting screw 34 is screwthreaded through the upper portion 31 of each clamp 30 for engagement with the margin of the cover plate and is held against displacement by a lock nut 35. One of the clamps, the right-hand one, has an upright collar or sleeve 36 secured to its upright portion 32 for rotatably receiving the upper end of an angular brace rod or element 37. The lower upright end of the rod 37 is rotatably confined in an apertured, horizontal ear or lug 38 which projects laterally from the lower portion of the baffle plate 24 adjacent the frame 11. An upright, slotted bar or lug 39 projects rearwardly from the other clamp for connecting said clamp to the baffle plate adjacent the frame and above the ear 38. As shown by the numeral 40 in FIG. 5, the slot is elongated horizontally and longitudinally for coacting with a bolt and nut 41 carried by the baffle plate and accommodating movement of the windrow attachment 23 about the axis of the bolt 28 which is offset with respect to the axis of the arc of curvature of the rear portion of the frame. In other words, the bolt and nut 41 may slide inwardly and outwardly within the slot 40 upon pivoting of the windrow attachment to adjusted positions.

Although the upper longitudinal margin of the baffle plate 24 and its flange 25 are substantially horizontal, as shown by the numeral 42 in FIG. 5, the lower margin of the plate has its inner portion inclined upwardly and inwardly to provide clearance for the blade assembly 20. Coextensive strips 43 and 44, of belting or other flexible material, are secured to and depend from the horizontal and inclined portions of the lower margin, being secured thereto by overlying flat bars 45 and 46 and suitable bolts and nuts 47. As shown by the numeral 48, the lower margin of the flexible strips 43 and 44 are recessed or cut away to accommodate the blade assembly. Due to the pivotal mounting of the windrow attachment 23, the same may be readily swung to adjusted positions for varying the width of the windrow. It is only necessary to loosen the adjusting screws 34 and slide the clamps 30 along the frame 11. The pivotal connection of the brace rod 37 to the sleeve 36 and ear 38 facilitates pivotal movement of the attachment. Of course, any extensive adjustment of the attachment necessitates loosening of the bolt 41.

In some rotary cutters, particularly smaller ones, only a single lift assembly is provided for both wheels and is disposed at the medial portion of the housing of the cutter whereby the windrow attachment cannot be mounted in the same manner. Portions of the marginal frame 50, one of the longitudinal cross braces 51 and the cover plate 52 of a rotary cutter of this type is shown in FIGS. 6–8. A modified windrow attachment 53 is provided for mounting on this cutter and includes a baffle plate 54, similar to the plate 24 and having a similar horizontal flange 55 at its upper longitudinal margin. As shown by the numeral 56, the entire inner portion of the plate 54 and its flange 55 are offset downwardly below the frame 50 so as to clear the cross brace 51. The inner portion 56 of the flange extends in the opposite direction to its outer portion 55 and has an angle bar 57 extending laterally from its inner end for pivotal connection to the cover plate 52 by a suitable bolt and nut 58. A modified mounting assembly 59 is provided for coacting with the marginal frame 50 and includes clamps 60 which are substantially identical to the clamps 30 and which will not be described in detail. The clamps 60 are connected in spaced relation by an angular bar 61 disposed externally of the frame and overlying the inner flange portion 56 of the baffle plate. An apertured ear or lug 62 projects horizontally rearward from the intermediate portion of the bar 61 for pivotal connection by a bolt and nut 63 to a similar ear or lug 64 extending laterally from the baffle plate 54. The lower portion of the plate has another similar ear or lug 65 underlying the ear 64 and pivotally attached by a bolt and nut 66 to the lower end of an angular brace element or bar 67. An apertured ear or lug 68 projects horizontally rearward from one end of the angular bar 61 adjacent one of the clamps 60 for pivotal connection with the upper end of the brace element 67 by a bolt and nut 69. In effect, the ear 68 is carried by the right-hand clamp. As shown by the numeral 70 in FIG. 8, the inner portion of the lower margin of the baffle plate is inclined upwardly and inwardly. Flexible strips 71 and 72, similar to the strips 43 and 44, are secured to the lower margin of the baffle plate by similar bars 73 and 74 and bolts and nuts 75. The strip 72 is recessed or offset as shown in 76 to accommodate the blade assembly of the rotary cutter. It is believed to be readily apparent that the modified windrow attachment 53 is adjustable in the same manner as the windrow attachment 23 to vary the width of the windrow.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A windrow attachment for a rotary cutter having a housing with a horizontal top, a skirt, a discharge opening and a horizontal revolving blade in the housing, including an upright member extending inwardly and outwardly through the discharge opening between the housing top and blade for coacting with the housing and blade to windrow material cut by the blade, means pivotally connecting the inner end portion of the member to the housing adjacent the axis of rotation of the blade whereby said member may be swung to vary the width of the windrow, and means adjustably securing the intermediate portion of said member to the rear margin of the housing.

2. A windrow attachment as set forth in claim 1 wherein the securing means includes a pair of spaced clamps detachably fastened to the margin of the housing.

3. A windrow attachment as set forth in claim 2 wherein the securing means includes a brace element having pivotal connection with the upright member and one of the clamps.

4. A windrow attachment as set forth in claim 2 wherein the securing means includes an angular bar connecting the clamps to each other and to the upright member.

5. A windrow attachment as set forth in claim 4 wherein the securing means includes a brace element pivotally connecting the angular bar to the upright member.

6. A windrow attachment as set forth in claim 1 wherein the pivotal connecting means includes an arm extending laterally from the inner end of the upright member.

7. A windrow attachment as set forth in claim 6 wherein the securing means includes a pair of spaced clamps detachably fastened to the margin of the housing.

8. A windrow attachment as set forth in claim 7 wherein the securing means includes a brace element having pivotal connection with the upright member and one of the clamps.

9. A windrow attachment as set forth in claim 7 wherein the securing means includes an angular bar connecting the clamps to each other and to the upright member.

References Cited in the file of this patent
UNITED STATES PATENTS

| | | |
|---|---|---|
| 2,489,059 | Surgi | Nov. 22, 1949 |
| 2,495,032 | Stuhl | Jan. 17, 1950 |
| 2,592,991 | Yeager et al. | Apr. 15, 1952 |
| 2,675,661 | Titzer | Apr. 20, 1954 |
| 2,855,744 | Phelps | Oct. 14, 1958 |
| 2,953,888 | Phillips et al. | Sept. 27, 1960 |